J. F. BURNS.
JUNCTION BOX FOR ELECTRICAL CONDUCTORS.
APPLICATION FILED SEPT. 30, 1908.
927,218.
Patented July 6, 1909.
2 SHEETS—SHEET 1.
FIG. I.
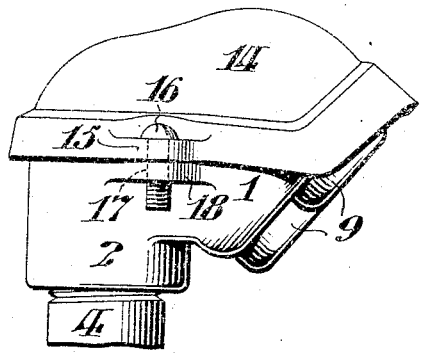
FIG. II.
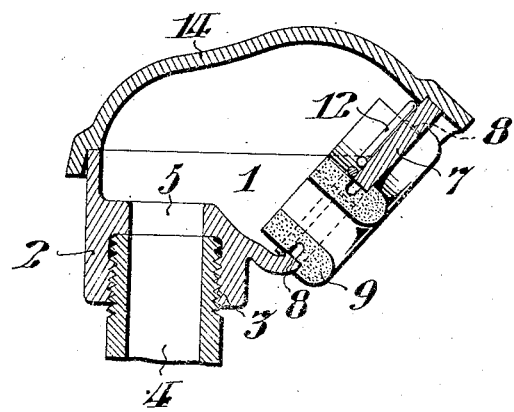
FIG. III.
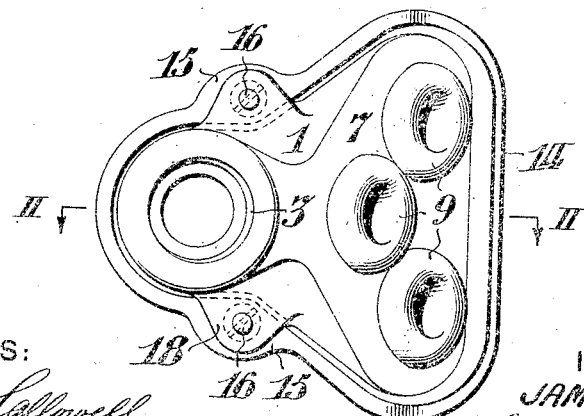
WITNESSES:
Clifton C Hallowell
Philip W Vessey
INVENTOR:
JAMES F. BURNS,

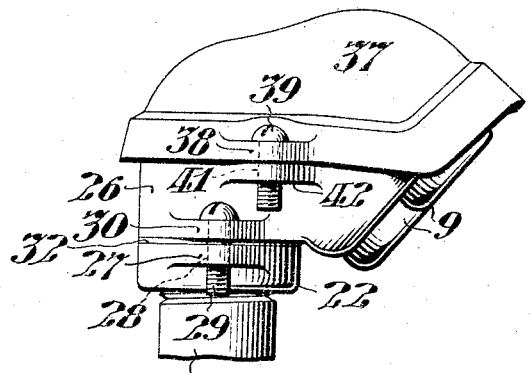
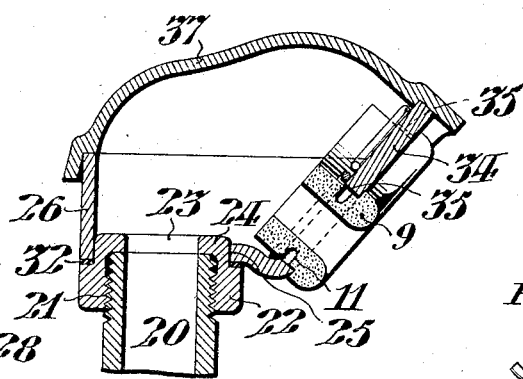
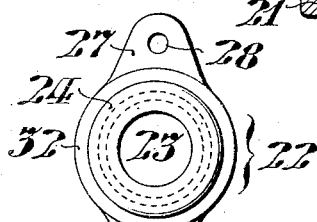
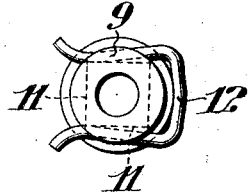
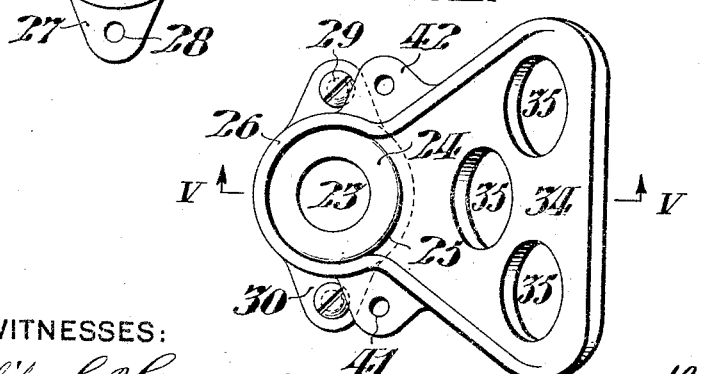

UNITED STATES PATENT OFFICE.

JAMES F. BURNS, OF PHILADELPHIA, PENNSYLVANIA.

JUNCTION-BOX FOR ELECTRICAL CONDUCTORS.

No. 927,218.
Specification of Letters Patent.
Patented July 6, 1909.

Application filed September 30, 1908. Serial No. 455,475.

*To all whom it may concern:*

Be it known that I, JAMES F. BURNS, of Philadelphia, in the State of Pennsylvania, have invented a certain new and useful Improvement in Junction-Boxes for Electrical Conductors, whereof the following is a specification, reference being had to the accompanying drawings.

My improvement is particularly applicable to terminal fittings for exposed conduits, and, as hereinafter described, my invention comprises a box having a screw threaded socket for a conduit; a wall extending obliquely to the axis of said conduit and having an outlet; a removable cover opposed to said socket, extending transversely with respect to the axis thereof; and means detachably securing said cover. In a modified form of my invention, said socket is in a member which is relatively rotary with respect to the box to which it is detachably connected, so that the conduit may be connected to the box, without rotation of the latter. A convenient adjunctive feature of my invention is the provision of insulating bushings fitted to openings in said obliquely extending wall, and having means distinct from the box arranged to retain them, and comprising spring clips engaging recesses in the bushings.

My invention comprises the various novel features of construction and arrangement hereinafter more definitely specified.

In the drawings; Figure I, is a side elevation of a box conveniently embodying my invention as applied to a vertical conduit. Fig. II, is a central vertical sectional view of said box taken on the line II, II in Fig. III. Fig. III, is an inverted plan view of the box shown in Figs. I and II. Fig. IV, is a side elevation of a box embodying a modified form of my invention. Fig. V, is a vertical sectional view of the box shown in Fig. IV, taken on the line V, V in Fig. VI. Fig. VI, is a plan view of the box shown in Figs. IV and V, with the cover and bushings removed. Fig. VII, is a plan view of the coupling member shown in Figs. IV, V and VI. Fig. VIII, is an inner end view of one of the bushings shown in Fig. V, with its retaining spring wire clip.

Referring to the form of my invention shown in Figs. I, II and III, the box comprises the base 1, having the socket member 2, containing the screw threaded socket 3, for the conduit 4, in axial alinement with the inlet 5. Said base comprises the outlet wall 7, extending obliquely to the axis of said conduit 4, in an approximately forty-five degree angular relation therewith, and having three outlets 8. Said outlets are respectively provided with insulating bushings 9, conveniently made of ceramic, and having exterior recesses 11, in rectangular relation, as indicated by dotted lines in Fig. VIII, arranged to engage the spring wire clips 12, in removable relation. Said base 1 is provided with the removable cover 14, having lugs 15, to receive the screws 16, which are fitted in the screw-threaded apertures 17, in the lugs 18, upon said base 1, whereby said cover is detachably secured upon said base.

The form of my invention above described may be conveniently employed for junction boxes of small size where it is not inconvenient to rotate the entire base to effect its screw threaded engagement with the conduit. However, for larger sizes of junction boxes, and for conduits so situated that it is inconvenient to rotate the entire box base thereon, I prefer to employ the form of my invention shown in Figs. IV to VII inclusive, wherein the conduit 20 is engaged in the screw-threaded socket 21, of the coupling member 22, in alinement with the inlet 23, in the boss 24, which is fitted to the opening 25 in the box base 26. Said coupling member 22 comprises oppositely extending lugs 27, having screw threaded apertures 28, for the screws 29, which extend through the lugs 30, on said box base 26, and thus detachably connect said socket member in rigid relation with said box. As shown in Figs. IV and V, a gasket 32 may be interposed between said box and socket member to hermetically seal the joint between them.

The box shown in Figs. IV to VI inclusive, comprises the outlet wall 34, having the outlets 35, which are provided with bushings 9, as above described, and said box is provided with a cover 37, like the cover 14, above described, having lugs 38, for the screws 39, which extend in screw-threaded engagement with apertures 41, in the lugs 42, on said box base 26.

The boxes above described are so arranged that, when their covers are removed, electrical conductors may be drawn straight through the conduits and then be conveniently returned through the outlet bushings. It may be observed that when said covers are closed, as shown in Figs. I and IV, they serve to shed rain from the boxes, the inclined position of the box walls having the outlets preventing access of rain through said outlets.

I do not desire to limit myself to the precise details of construction and arrangement above described, as it is obvious that various modifications may be made therein, without departing from the essential features of my invention, as defined in the appended claims.

I claim:—

1. In a junction box having a socket for a conduit; a wall in said box extending obliquely to the axis of said conduit, in a plane intersecting said conduit, and having an outlet; an insulating bushing, having a recess, detachably fitted in said outlet; means distinct from the box arranged to retain said bushing, comprising a spring clip arranged to engage the recess in said bushing; a removable cover for said box, opposed to said socket member and extending transversely to said axis; and, means detachably securing said cover.

2. In a junction box having a socket member in unitary relation therewith, provided with threads for connection with a conduit; a wall in said box extending obliquely to the axis of said conduit, and having an outlet; an insulating bushing detachably fitted in said outlet; means distinct from said box arranged to retain said bushing; a removable cover for said box opposed to the socket and extending transversely to said axis; and, means detachably securing said cover.

3. In a junction box having oppositely extending lateral lugs, and a socket member in unitary relation therewith, said socket member being provided with threads for connection with a conduit; a wall extending obliquely to the axis of said conduit and having an outlet; a cover opposed to the socket and extending transversely with respect to the axis thereof; lugs extending laterally from said cover, arranged to register with the lugs on said box; and, means connecting said lugs, arranged to detachably retain said cover on said box.

In testimony whereof, I have hereunto signed my name at Philadelphia, Pennsylvania, this twenty-ninth day of September, 1908.

JAMES F. BURNS.

Witnesses:
JOHN H. BAKER,
CLARENCE W. SHICK.